US008433702B1

(12) United States Patent
Carrino et al.

(10) Patent No.: US 8,433,702 B1
(45) Date of Patent: Apr. 30, 2013

(54) HORIZON HISTOGRAM OPTIMIZATIONS

(75) Inventors: John A. Carrino, Menlo Park, CA (US); Michael Harris, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/246,867

(22) Filed: Sep. 28, 2011

(51) Int. Cl.
*G06F 7/00* (2006.01)
*G06F 17/30* (2006.01)

(52) U.S. Cl.
USPC .......................................... 707/717; 707/754

(58) Field of Classification Search .................. None
See application file for complete search history.

(56) References Cited

U.S. PATENT DOCUMENTS

| | | | | | |
|---|---|---|---|---|---|
| 5,542,089 | A | * | 7/1996 | Lindsay et al. ................... | 1/1 |
| 5,613,105 | A | * | 3/1997 | Zbikowski et al. ................ | 1/1 |
| 6,289,334 | B1 | * | 9/2001 | Reiner et al. ..................... | 1/1 |
| 6,311,181 | B1 | * | 10/2001 | Lee et al. ........................ | 1/1 |
| 7,783,679 | B2 | * | 8/2010 | Bley .............................. | 707/809 |
| 2005/0021397 | A1 | * | 1/2005 | Cui et al. ........................ | 705/14 |
| 2007/0168336 | A1 | * | 7/2007 | Ransil et al. ..................... | 707/3 |
| 2011/0270871 | A1 | * | 11/2011 | He et al. ......................... | 707/769 |

OTHER PUBLICATIONS

Partitioning algorithm for the computation of Average Iceberg Queries, Bae et al., DaWak 2000, LNCS 1974, pp. 276-286, 2000.*
Computing Icerberg Queries Efficiently, Fang et al., VLDB '98 Proceedings of the 24rd International Conference on Very Large Data Bases pp. 299-310, 1998.*
On Incorporating Iceberg Queries in Query Processors, Leela et al., Technical Report, TR-2002-01, Database Systems for Advanced Applications Lecture Notes in Computer Science vol. 2973, 2004, pp. 431-442 , 2004.*
Methods for mining frequent items in data streams: an overview, Liu et al., Knowl Inf Syst (2011) 26: 1-30, 2009.*
Probabilistic Optimization of Top N Queries, Donjerkovic et al., Technical Report #1395, Mar. 1999.*
Efficient Computation of Iceberg Cubes with Complex Measures, Han et al., ACM SIGMOD, May 21-24, 2001.*
Computing Iceberg Queries Efficiently, Fang et al., Proceeding Proceedings of the 24rd International Conference on Very Large Data Bases (VLDB '98), pp. 299-310, 1998.*
Karp, R. et al., "A Simple Algorithm for Finding Frequent Elements in Streams and Bags" dated Mar. 2003 (5 pages); downloaded from the Internet http://dl.acm.org/citation.cfm'?id=762471.762473.

* cited by examiner

*Primary Examiner* — Kuen S Lu
*Assistant Examiner* — Augustine K Obisesan
(74) *Attorney, Agent, or Firm* — Hickman Palermo Truong Becker Bingham Wong LLP; Karl T. Rees (57) ABSTRACT

Values that occur above a threshold frequency for certain characteristic(s) of a data set are identified. A limited number of count buckets are allocated based on the threshold. Buckets store proxy counts for identifying candidate sets of values rather than actual counts. The data set is divided and each portion is analyzed separately, by iterating through each item in that portion. During each iteration, depending on an item's value(s), a bucket is incremented, all buckets are decremented, or a bucket is assigned or reassigned to count different value(s). A candidate set of values and associated counts is selected for a portion based on the buckets. The candidate sets for each portion are merged and, in some embodiments, filtered based on the associated counts. Actual frequencies are then determined for the values that remain in the merged candidate set.

33 Claims, 8 Drawing Sheets

HORIZON HISTOGRAM OPTIMIZATIONS

TECHNICAL FIELD

Embodiments relate generally to data analysis, and, more specifically, to techniques for identifying items in a data set that occur above a certain frequency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data item may be a set of associated data values that quantify various characteristics. Data items quantify characteristics of a wide-variety of items, such as events, entities, places, transactions, or concepts. A data item may be stored as one or more blocks, segments, or other units of data within one or more computer-readable media. The unit(s) of data in which a data item are stored are logically mapped by one or more computing devices to a logical representation of the data item. A logical representation may be, for instance, one or more data records, table rows, log entries, text files, documents, object instances, images, videos, audio recordings, and so forth. A data item may comprise one or more values that correspond to defined characteristics, such as, for example, the columns or fields of a database table or the properties of a data file. A data item may also or instead have one or more values that yield derived characteristics. Such derived characteristics may be determined by analysis of the value(s) of a data item, and may include, for example, a metric calculated by application of a function or a classification determined by pattern recognition.

Similarly structured data items are often grouped together in collections herein referred to as data sets. For example, the rows in a table may represent distinct data items that have been grouped together because they can be described by similarly labeled columns or fields. Mechanisms for defining and organizing collections include, without limitation, tables, arrays, folders, directories, indexes, and so forth.

A useful task in data mining or data analysis is to identify values that occur above a threshold frequency for certain characteristic(s) within the items of a data set. This task is sometimes referred to as an "iceberg query" or "hot list analysis." For example, one may wish to identify the names of lending banks that appear more than five percent of the time in a set of items that represent distinct subprime loans. As another example, one may wish to identify pairs of source Internet Protocol addresses and destination Internet Protocol addresses that appear in more than 0.2 percent of logged packets of network traffic.

Some approaches to iceberg queries or hot list analysis involve the allocation of memory buckets to count each occurrence of each distinct value (or combination of values) for the targeted characteristic(s). However, such approaches can be memory-intensive, especially when the targeted characteristic(s) may have a large number of possible distinct values. A less memory intensive approach is described by Karp, et al., in "A Simple Algorithm for Finding Frequent Elements in Streams and Bags," ACM Transactions on Database Systems, Volume 28 Issue 1, March 2003, the contents of which are hereby incorporated by reference for all purposes as if set forth their entirety. However, this approach, hereinafter referred to as the Karp approach, assumes that the entire data set is analyzed serially.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0. | General Overview |
| 2.0. | Structural Overview |
| 3.0. | Functional Overview |
| | 3.1. Iceberg Queries |
| | 3.2. Serial Evaluation of a Data Set |
| | 3.3. Parallel Evaluation of a Data Set |
| 4.0. | Implementation Mechanism—Hardware Overview |
| 5.0. | Extensions and Alternatives |

1.0. General Overview

Distributed approaches, techniques, and mechanisms are disclosed for identifying values that occur above a threshold frequency for certain characteristic(s) of the items of a data set. According to an embodiment, a number of count storage buckets are allocated in a system based on a threshold frequency. A counting operation is performed on a particular subset of the data set by iterating through each item of the particular subset. When the item corresponds to a distinct value that is not currently associated with any of the count storage buckets, and at least one of the count storage buckets is available to store a count for the distinct value, the distinct value is associated with the available bucket and the count of the available bucket is initialized. When the item corresponds to a distinct value that is currently associated with a particular bucket of the count storage buckets, the count of the particular bucket is incremented. When the item corresponds to a distinct value that is not associated with any of the count storage buckets, and none of the count storage buckets is available to store a count for the distinct value, at least the positive counts stored in each of the count storage buckets are decremented. Upon completion of the iterating, a candidate set of distinct values and associated counts is selected, for the particular subset of the data set, based on the distinct values that are associated with the count storage buckets after the counting operation. A plurality of candidate sets of distinct values and associated counts are selected in the above manner, by repeating at least the counting operation and the selecting of a candidate set for each particular subset of a plurality of non-overlapping subsets of the data set. A merged candidate set of distinct values is then formed by merging the plurality of candidate sets based on the associated counts. For each distinct value in the merged candidate set, a frequency of occurrence within the data set is determined. A set of actual high-frequency distinct values is then determined by comparing the frequencies of the distinct values in the merged candidate set with the threshold frequency.

Merging the plurality of candidate sets may be accomplished in a variety of ways. In an embodiment, merger is accomplished by, for each distinct value found in the plurality of candidate sets, summing all counts associated with the distinct value. Only those distinct values having the highest summed counts are accepted into the merged candidate set. To ensure that all possible values that occur above the threshold frequency are included in the merged candidate set, the number of values selected for the merged candidate set is based at least partially on the inverse of the threshold frequency.

In an embodiment, the plurality of candidate sets is merged in a manner similar to the manner by which the candidate sets were identified in the first place. A proxy data set is generated, comprising one or more members for each distinct value in the plurality of candidate sets. The one or more members correspond, in number, to the associated counts for that distinct value. A proxy counting operation is performed on the proxy data set by iterating through each member of the proxy data set. When the member corresponds to a distinct value that is currently associated with a particular bucket of the count storage buckets, the count of the particular bucket is incremented. When the member corresponds to a distinct value that is not associated with any of the count storage buckets, and at least one of the count storage buckets is available to store a count for the distinct value, the distinct value is associated with an available bucket and the count of the available bucket is initialized. When the member corresponds to a distinct value that is not associated with any of the count storage buckets, and none of the count storage buckets is available to store a count for the distinct value, at least each positive count of the count storage buckets is decremented. The merged candidate set is then identified based on which distinct values are associated with the count storage buckets upon completion of the proxy counting operation.

In an embodiment, a count storage bucket is an available bucket when the count storage bucket is empty or when the count storage bucket stores a count that is less than a count to which buckets are initialized. In an embodiment, repeating the counting operation for each particular subset of the data set comprises performing each counting operation at a different node of a plurality of nodes. In an embodiment, at least two or more nodes in the plurality of nodes perform the counting operation in parallel using different sets of count storage buckets. In an embodiment, each node has exclusive access to the particular subset of the data set for which the node performs the counting operation.

In an embodiment, the invention encompasses a computer apparatus and a computer-readable medium configured to carry out the foregoing steps.

2.0. Structural Overview

Figure 1:
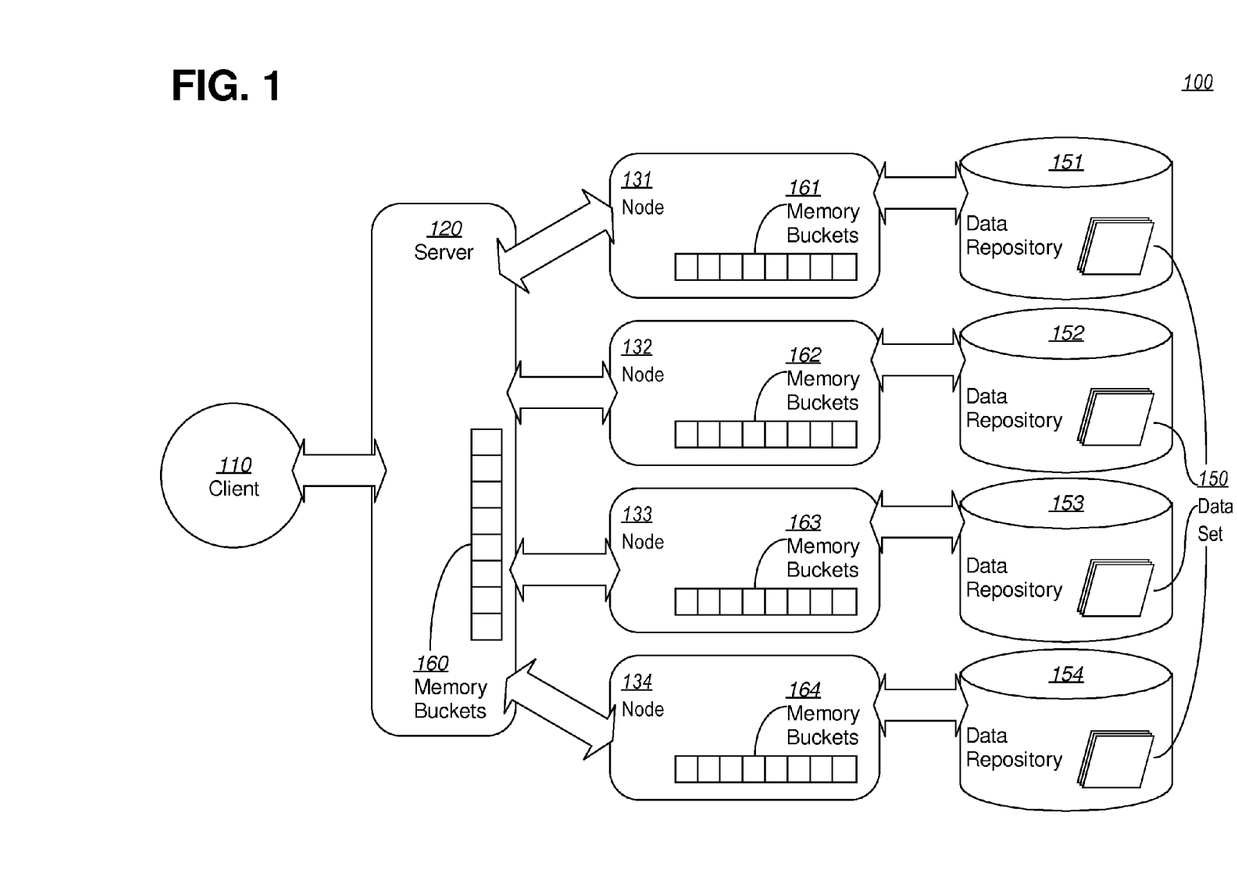
FIG. 1 is block diagram of a system in which the techniques described herein may be practiced.

FIG. 1 is block diagram of a system 100 in which the techniques described herein may be practiced, according to an embodiment. System 100 comprises a client 110, a server 120, nodes 131-134, and data repositories 151-154. System 100 is but one example of a system for practicing the techniques described herein. Other embodiments may comprise fewer or additional components, in varying arrangements. For example client 110 may be omitted or the same as server 120, or system 100 may comprise a greater number of servers 120, nodes 131-134, or data repositories 151-154.

Each of client 110, server 120, and nodes 131-134 are applications implemented by any combination of software and/or hardware components at one or more computing devices. For example, client 110 may be a data visualization software program implemented by one or more processors that execute instructions stored in computer-readable media at a client computing device. As another example, server 120 and nodes 131-134 may each be server application components implemented by one or more processors within a system of server computing devices that execute instructions stored in computer-readable media. System 100 is not necessarily limited to any particular configuration of software and hardware components. For example, client 110, server 120, and nodes 131-134 may each be components of a single application implemented by a single computing device. As another example, server 120 may be implemented at the same computing device as one of nodes 131-134. Alternatively, each of client 110, server 120, and nodes 131-134 may be a specially configured computer rather than an application.

Data repositories 151-154 are data storage mechanisms that collectively store a data set 150 of data items. Data repositories 151-154 may each mirror the entire data set 150, or data repositories 151-154 may each contain a different portion of data set 150. The number of data repositories 151-154 is not important, and may vary depending on factors such as user preference, system workload, storage system availability, the size of data set 150, the amount of storage available in data repositories 151-154, the amount of data other than data set 150 stored in data repositories 151-154, and so forth. In an embodiment, for example, only a single data repository may be required, though each node 131-134 may still have exclusive ownership over different portions of data set 150 within the single data repository.

Data repositories 151-154 may include, for example, one or more data storage components such as database systems, file systems, database servers, databases, file servers, non-volatile hard disks, and so forth. In an embodiment, data repositories 151-154 may collectively form a database system with nodes 131-134 and server 120. In such an embodiment, data repositories 151-154 are databases, while server 120 and/or nodes 131-134 are database servers or components thereof. In another embodiment, data repositories 151-154 are one or more self-contained database systems, with which nodes 131-134 interface via database commands.

Client 110 transmits requests for data over a communication mechanism to server 120. The communication mechanism may include any suitable mechanism for transmitting data, including, without limitation, any combination of networks, ports, or sockets. Server 120 responds to these requests over the communication mechanism as well.

For example, client 110 may be configured to send a request to server 120 for data that indicates which values (or combination of values) occur above a specified frequency for specified characteristic(s) of data set 150. Server 120 may then be configured to respond with data indicating the requested set of values. The data may include other information, such as frequencies or counts associated with each value. Client 110 may then display the data to the user in any of a variety of forms, such as a histogram or list. Client 110 may have been configured to send such a request for a variety of reasons. For example, the range of possible values for the specified characteristics may be large enough that server 120 cannot provide counts or frequencies for each possible value in an acceptable amount of time. Client 110 is thus configured to initially request only the information necessary for client 110 to produce a histogram of the values that occur above a frequency of interest.

To satisfy requests from client 110, server 120 utilizes nodes 131-134. Specifically, server 120 sends commands to some or all of nodes 131-134 to perform operations relating to the data stored at each node's respective data repository 151-154. Server 120 may communicate such commands, and receive data in return, over any suitable communication mechanism. Server 120 may or may not further process the data from nodes 131-134 before responding to client 110.

Each node 131-134 in turn performs operations requested by server 120 by reading, writing, and/or processing data from a data repository 151-154. Nodes 131-134 may, for example, read or write data from data repositories 151-154 using any combination of database commands, file commands, and/or other input/output operations. The actual number of nodes 131-134 relied upon by server 120 to service any particular request is not necessarily important, particularly when data repositories 151-154 store overlapping or mirrored portions of data set 150. For example, the number of nodes 131-134 may be fewer or greater depending upon factors such as user preference, the number of computing devices or processors available to process data set 150, and/or the number of data repositories 151-154 in which data set 150 is stored.

To assist in processing data, server 120 and nodes 131-134 each respectively comprises a set of memory buckets 160-164. Each bucket of sets 160-164 is an allocated page, block or other structure of electronic digital memory. In an embodiment, each bucket of sets 160-164 is allocated specifically for holding a count variable that may be incremented or decremented over time, in association with a label, or pointer to a label, indicating a value or a combination of values for which the count variable is held. In an embodiment, the number of allocated buckets in sets 160-164 changes depending on the data operations that nodes 131-134 and server 120 are performing. For example, if server 120 has been asked to identify which values in data set 150 occur above a threshold frequency for certain characteristic(s), the number of buckets to allocate may be selected based upon the threshold frequency. In an embodiment, the maximum number of buckets ever allocated in a particular set 160-164 to perform such a task is the inverse of the threshold frequency, rounded up. However, in other embodiments, a greater number of buckets may be allocated. In an embodiment, the number of buckets in each of sets 160-164 is the same.

The benefits yielded by practice of the techniques described herein are particularly pronounced in distributed arrangements of system 100. For example, in an embodiment, the bandwidth and/or throughput between server 120 and most of nodes 131-134 is much lower than that between nodes 131-134 and data repositories 151-154. For example, server 120 may be connected to nodes 131-134 by a wide area network, whereas nodes 131-134 are connected to their respective data repositories 151-154 over a much faster local area network. In an embodiment, each of nodes 131-134 is co-located with its respective data repository 151-154, but at least one of nodes 131-134 is located in a geographic location that is different from those at which other nodes 131-134 are located. Thus, no single node 131-134 has immediate access to the entire data set 150. In an embodiment, server 120 may further be located at a different geographic location from each of nodes 131-134, or may be co-located with one or more of nodes 131-134. However, the techniques described herein still yield benefits even in arrangements of system 100 where bandwidth and throughput constraints are not of concern.

3.0. Functional Overview

According to an embodiment, a limited number of count buckets are allocated based on a threshold frequency. Buckets store proxy counts for identifying candidate sets of values rather than actual counts. The data set is divided and each portion is analyzed separately, by iterating through each item in that portion. During each iteration, depending on an item's value(s), a bucket is incremented, multiple buckets are decremented, or a bucket is assigned or reassigned to count different value(s). A candidate set of values and associated counts is selected for a portion based on the buckets. The candidate sets for each portion are merged and, in some embodiments, filtered based on the associated counts. Actual frequencies are then determined for the values that remain in the merged candidate set.

3.1. Iceberg Queries

As discussed above, embodiments are disclosed for identifying values that occur above a threshold frequency for certain characteristic(s) of the items of a data set. The identification process is often referred to as an "iceberg query." However, the term "query" is used simply for naming convenience, and is not limited to a conventional database query; other forms of requests or messages may be used.

Execution of the "iceberg query" involves two specified parameters—a threshold count or frequency, and a set of one or more characteristics whose values are to be counted. In its simplest form, the iceberg query involves counting each distinct value or combination of values for the one or more specified characteristics. Only those values whose counts are at above the threshold count or frequency are considered to satisfy the "query."

An example iceberg query may be formulated in the Structured Query Language ("SQL") with a query such as: "SELECT x, count(x) FROM tab GROUP BY x HAVING count(x)>=thresh." The example query assumes that "x" is the characteristic of which values are counted, that the relevant data set is stored in the table named "tab," and that the threshold "thresh" has been specified as an absolute count as opposed to a frequency. The threshold count "thresh" is nonetheless a function a threshold frequency, and is easily calculated as the product of the total count of rows in table "tab" and a specified threshold frequency. Of course, the above example is but one way of formulating an iceberg query. Moreover, literal performance of an iceberg query formulated as above may be suboptimal, particularly for large data sets.

In an embodiment, then, a server such as server 120 provides clients such as client 110 with the ability to instruct the server to perform an "iceberg query" via a special function call that causes the server to initiate performance of the techniques described herein. Moreover, in an embodiment, a server may perform an "iceberg query" using the techniques described herein without an explicit client request, as part of another data operation.

Figure 2:
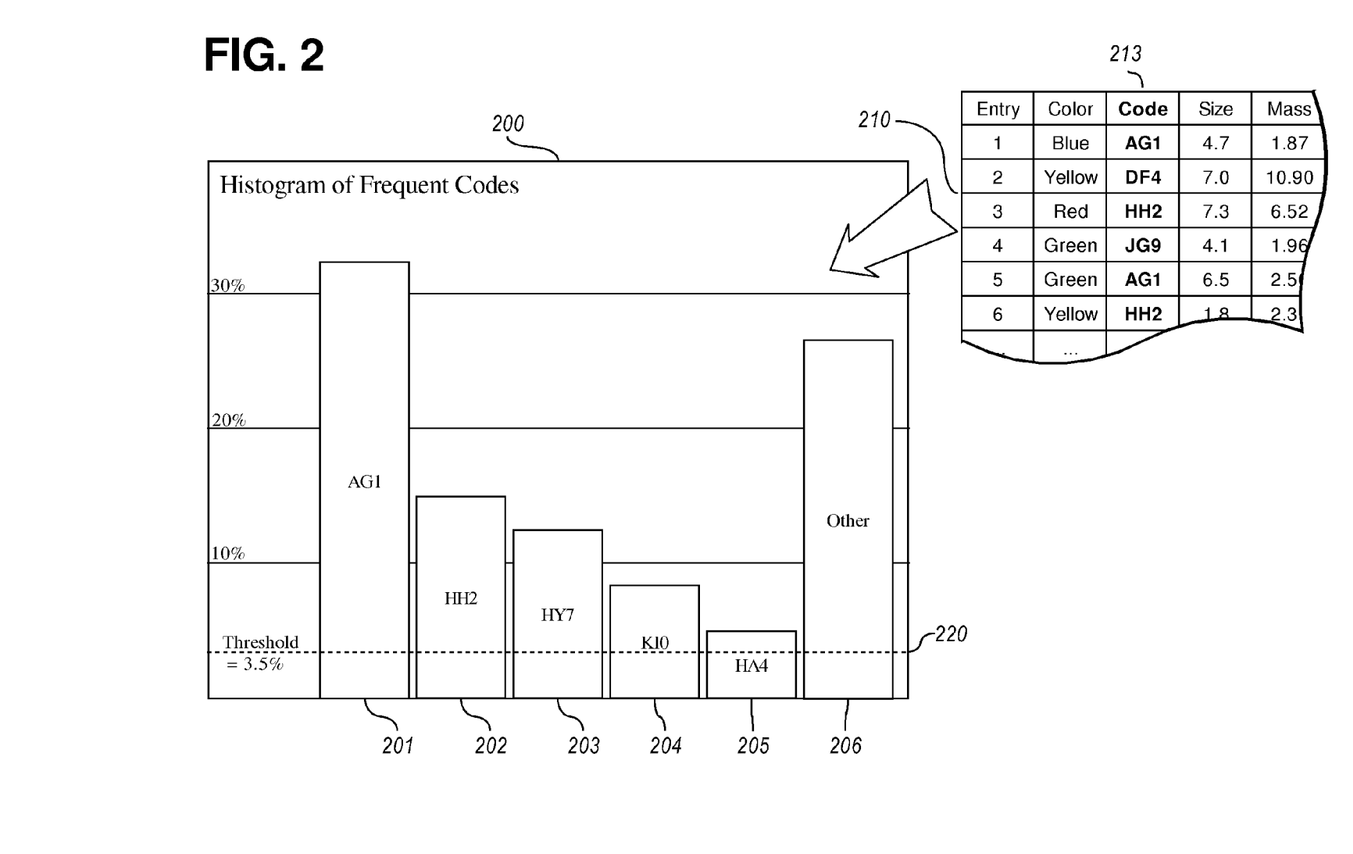
FIG. 2 illustrates a graph of results from an "iceberg query" on a table.

FIG. 2 illustrates a graph 200 of results from an "iceberg query" on a table 210, according to an embodiment. Graph 200 illustrates one of the many applications of an iceberg query. Specifically, graph 200 is a histogram with bars 201-

205 indicating the frequency with which certain values appear in the "code" column 213 of table 210. The graph includes bars 201-205 only for those values of the "code" column 213 that appear above a threshold frequency of 3.5%, as indicated by example threshold line 220. For example, client 110 may have generated graph 200, in part, by issuing an iceberg query to retrieve the set of values corresponding to bars 201-205. For illustrative purposes, the graph further includes an "other" bar 206 indicating the sum of the frequencies of all other values not returned by the iceberg query.

Figure 3:
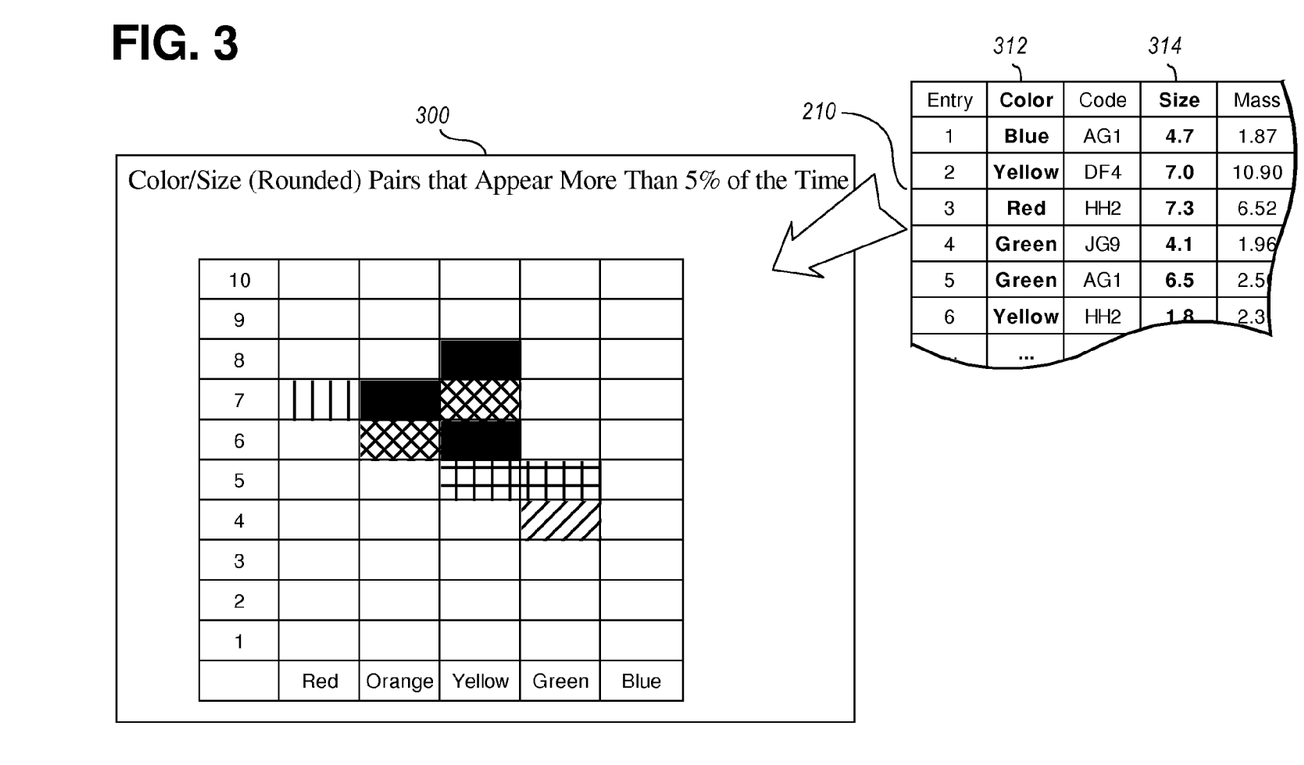
FIG. 3 illustrates another graph of results from an "iceberg query" on the table.

FIG. 3 illustrates a graph 300 of results from an "iceberg query" on table 210, according to an embodiment. Graph 300 illustrates another one of the many applications of an iceberg query. Specifically, graph 300 is a heat map indicating the most frequent combinations of values for columns 312 and 314 found in the rows of table 210. For graph 300, the values of column 314 have been rounded to the nearest integer. Only those combinations that occur above a specified threshold of 5% are depicted in the heat map of graph 300. For example, client 110 may have generated graph 300 by issuing an iceberg query to determine which combinations of values to highlight.

3.2. Serial Evaluation of a Data Set

Figure 4:
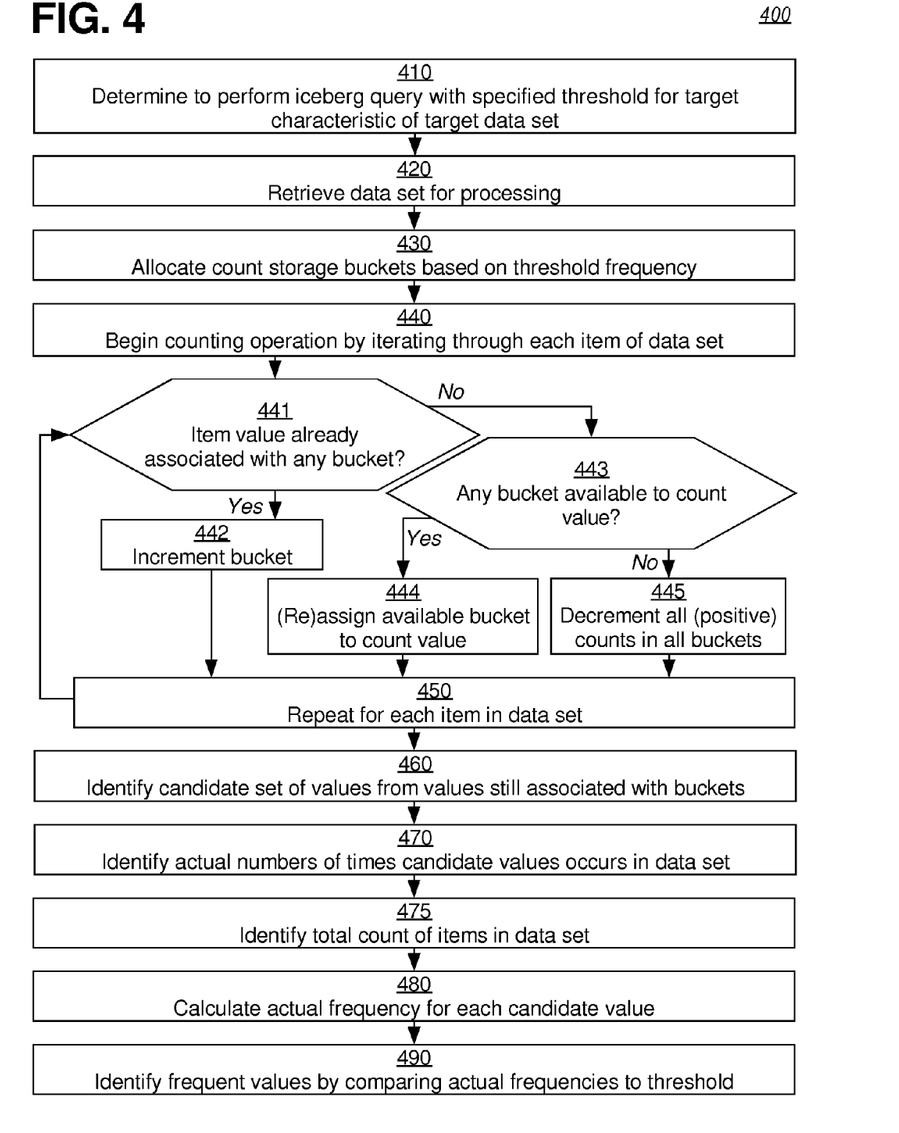
FIG. 4 is a flow chart illustrating a method for executing an iceberg query on a data set by serially evaluating the items of the data set.

FIG. 4 is a flow chart 400 illustrating a method for executing an iceberg query on a data set by serially evaluating the items of the data set, according to an embodiment. Flow 400 is an example implementation of the Karp approach. Flow 400 is but one example implementation. Other implementations may comprise additional or fewer steps, in potentially different arrangements. Flow 400 is described with respect to an iceberg query that has only one targeted characteristic. However, the techniques described herein may be extended to iceberg queries that target multiple characteristics by simply changing any references to "target characteristic" or "value" to "target characteristics" and "combination of values." Further, in the following description, a special-purpose computer or logic may perform the operations that are described for an application; thus FIG. 4 represents a process that may be performed by many different kinds of computers or other functional elements.

At block 410, an application, such as nodes 131-134 or server 120, determines to perform an "iceberg query" using a target threshold frequency on a target data set, such as data set 150, with respect to a target characteristic. Block 410 may occur, for example, in response to an instruction from a client such as client 110 or a server such as server 120. Alternatively, the determination of block 410 may be made as part of data processing routine initiated by the application. In either event, the target threshold frequency may be specified directly, or it may be calculated from data such as a specified threshold count and the number of items in the data set.

At block 420, the application retrieves the data set, or the relevant portions thereof, for processing. The application may, for instance, retrieve each item in the data set from a data repository, such as repository 151. Or, the application may request that the data repository provide the application with a result set in which each item is reduced only to its respective value for the target characteristic. Block 420 may be performed entirely up front, or block 420 may be performed on demand, concurrent with other blocks, depending on factors such as the amount of time it takes to retrieve the data set from non-volatile storage and/or how much of the data set the application can maintain in non-volatile memory.

At block 430, the application allocates count storage buckets, such as the set of buckets 161, up to a maximum number that is based on the target threshold frequency. These buckets will be used to hold proxy counts for certain distinct values. The proxy counts are intended to assist in identifying candidate high frequency values, as opposed to actual counts of those distinct values. In an embodiment, block 430 includes requesting that a memory management component reserve a number of blocks, segments, or other units of memory for use by the application. The number of units may be proportional to the size of each bucket and the number of buckets. In an embodiment, block 430 also includes formatting the memory in such a manner that it contains a set of structures configured for maintaining count variables and associations of those count variables to specific values. For example, the application may instantiate an array of count objects, with each count object comprising a count variable and value pointer.

In an embodiment, the maximum number of buckets allocated is substantially less than the number of distinct values for the target characteristic in the data set. In an embodiment, the number of buckets is the inverse of the target threshold frequency, or a function thereof. For example, if the target frequency were 10%, the number of buckets may be 1/0.10, or 10. As another example, if the target frequency were 30%, the number of buckets may be a 1/0.30, or 3.33, rounded up to 4.

In an embodiment, the count storage buckets are all allocated up front. In an embodiment, the count storage buckets of block 430 are allocated as needed in block 444 below, until the maximum number of count storage buckets is reached.

At block 440, the application begins to perform a counting operation by iterating through each item in the data set. The counting operation includes at least blocks 441-450.

At block 441, the application determines whether the current item corresponds to any distinct value that is already associated with any of the count storage buckets. That is, the application determines whether the application is already maintaining a count for the value of the targeted characteristic (s) of the current item. If so, flow proceeds to block 442, where the application increments the count of the associated bucket. From block 442, flow proceeds to block 450.

If, in block 441, the application determines that the distinct value for the current item's target characteristic is not already associated with any of the count storage buckets, the application proceeds to block 443. At block 443, the application determines whether any of the count storage buckets are available to store a count for the value or combination of values that corresponds to the item. In an embodiment, a count storage bucket is considered to be available if it is empty and/or if it maintains a count of 0 or less. In an embodiment, a count storage bucket is available if the maximum number of count storage buckets is not currently allocated. If a count bucket is available, then at block 444, the count bucket is associated with the distinct value of the current item, and the count variable for the count bucket is initialized to one. From block 444, flow proceeds to block 450.

If a count bucket is not available, then at block 445, the application decrements all positive counts associated with the count buckets. In an embodiment, each count variable in the count storage buckets is decremented by one. In an embodiment, the application may ignore empty count buckets or count buckets with counts less than one. Optionally, the application may follow block 445 by emptying or even deleting count buckets whose counts are, as a result of block 445, less than one. In an embodiment, count buckets may be deallocated upon their respective counts becoming equivalent to zero, and then reallocated when associated with a new value. From block 445, flow proceeds to block 450.

At block 450, the counting operation repeats until blocks 441-445 are performed for each item in the data set. However, in some embodiments, iteration may be terminated early. For example, the application may terminate early if the application can calculate that, due to the number of unprocessed items remaining, it would be impossible to re-associate any count bucket with a different distinct value.

At block 460, the application identifies a candidate set of values that potentially satisfy the iceberg query based on the values associated with count buckets upon termination of the iterative counting operation. In an embodiment, the candidate set is simply the set of all values associated with count buckets. In an embodiment, certain values, such as any values that do not have a positive count, are omitted from the candidate set.

At block 470, the application identifies the actual number of times each value in the candidate set appears for the target characteristic of the data set. The identifying operation is necessary because in many cases, due to block 445, the count in the count buckets, upon completion of the iterative counting operation, does not accurately reflect the actual count of occurrences of the value.

At block 475, the application identifies the total number of items in data set, if the total number is not already known.

At block 480, the application calculates an actual frequency with which each value in the candidate set occurs for the target characteristic in the data set, based on the results of block 470 and 475.

At block 490, the application removes from the candidate set all values whose actual frequency is less than the threshold frequency. The set of all remaining values is the "answer" to the iceberg query.

In an embodiment, even though the candidate values are essentially recounted as a result of block 470, the above method may be more efficient for certain data sets because the amount of memory required for count storage buckets is minimized. That is, even with the addition of block 470, the above blocks can, in many cases, be performed much more efficiently than allocating storage to count an unknown and potentially very large number of distinct values.

A variety of similar implementations provide substantially the same result as the above method. For example, although the number one has been used as a baseline for initialization of newly assigned values and for determining when buckets become available, the techniques may utilize any number as a baseline for these and other considerations.

Example Serial Evaluation

Figure 5:
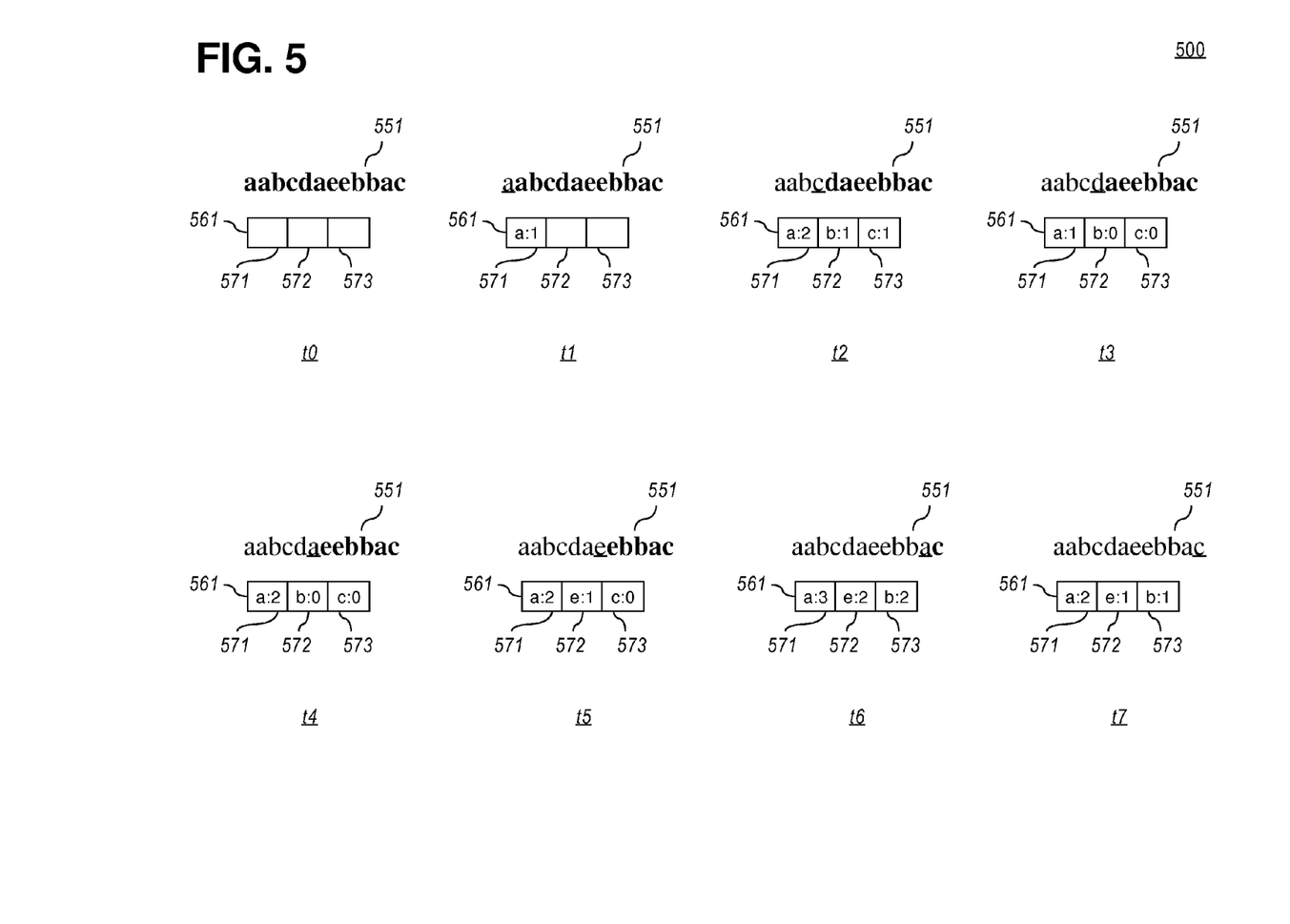
FIG. 5 is a time diagram illustrating the use of a limited number of count storage buckets to count an example data set.

FIG. 5 is a time diagram illustrating the use of a limited number of count storage buckets 561 to count an example data set 551, according to an embodiment. Example data set 551 comprises a set of twelve data items, each of which comprises in turn a single character value a-e. Specifically, the data set is depicted as the stream of characters "aabcdaeebbac." For illustrative purposes, data set 551 has been kept small and simple, but the technique described below may easily be extended to much larger and more complex data sets.

The set of count storage buckets 561 comprises buckets 571-573. The number of count storage buckets has been selected based on a threshold frequency of 33.3%. That is, the number of count storage buckets is sufficient to identify any and all values in data set 551 that occur more than one third of the time. Even though the number of count storage buckets (three) is smaller than the number of distinct values in the data set (five), the technique described in FIG. 4 is still capable of identifying which items occur above the threshold frequency, regardless of how many distinct values appeared in data set 551.

At t0, each of count storage buckets 571-573 is empty, and all of the items in data set 551 remain unprocessed, as denoted by each bold character in data set 551.

At t1, the first item in data set 551, having a value of a, has just been processed, as denoted by the underlining of the character a. The value a was not associated with any of buckets 571-573 immediately prior to processing. Per block 444 of FIG. 4, then, the value a has been assigned to bucket 571, and the count associated with 571 has been initialized to one (1).

At t2, the first four items in data set 551 have been processed, as denoted by the lack of bolding for the first four depicted characters. Per block 442 of FIG. 4, processing of the second item, whose value was also a, resulted in incrementing the count of bucket 571, which had already been assigned to the value a. Processing of the third and fourth items resulted, respectively, in assigning the value b to bucket 572 and the value c to bucket 573. Both of the buckets are initialized to one (1).

At t3, the fifth item in data set 551 is processed. The fifth item corresponds to the value d, which is not associated with any bucket. Prior to processing the fifth item, all buckets had values of one or greater. Thus, no bucket is available for reassignment to count the value d. Therefore, per block 445 of FIG. 4, the counts in each of buckets 571-573 is decremented. Therefore, bucket 571, associated with the value a, now has a count of one (1). Bucket 572, associated with the value b, now has a count of zero (0). Bucket 573, associated with the value c, now has a count of zero (0). Optionally, buckets 572 and 573 could be emptied, since their counts are now below the availability threshold of one. In an embodiment, once a bucket has a count that is equivalent to zero (0), the bucket may be disassociated with its value and/or deallocated. The bucket may then be reallocated when a new value is to be associated with the bucket.

At t4, the sixth item in the data set is processed. The sixth item corresponds to the value a. The count of bucket 571 is therefore incremented again.

At t5, the seventh item in the data set is processed. The seventh item corresponds to the value e, which was not associated with any bucket immediately prior to t5. Accordingly, the value e should be assigned to any available bucket, if possible. In this case, the value e is assigned to bucket 572. Even though bucket 572 was formerly assigned to the value b, bucket 572 is now available because the count of bucket 572 was less than one immediately prior to t5. Bucket 572 is initialized to one (1).

At t6, the eighth through eleventh items have been processed. The values a and e each occurred once and were thus the counts of buckets 571 and 572 were each incremented once, to three (3) and two (2) respectively. The value b occurred twice in this span. At the time of the first of these occurrences of the value b, the value b was not associated with a bucket, and thus assigned to the bucket 573. The bucket 573 was available because its count was zero (0) when the first value b was encountered. After the second of the occurrences of the value b, the value b was incremented to two (2).

At t7, all items in data set 551 have been processed. The last item corresponded to the value c. None of buckets were associated with the value c at the time the last item was processed. Moreover, all of the buckets stored counts of one or greater. Thus, none of the buckets were available for reassignment to the value c. Therefore, the counts stored in buckets 571-573 were each decremented by 1.

The resulting buckets 571-573 store counts of two (2), one (1), and one (1), respectively, and are associated with the values a, e, and b, respectively. Each value in data set 551 that occurs above the threshold frequency of 33.3% is guaranteed to be associated with one of buckets 571. However, an actual count of these items must take place to determine which of these values actually occurs above the threshold frequency.

3.3. Parallel Evaluation of a Data Set

Figure 6:
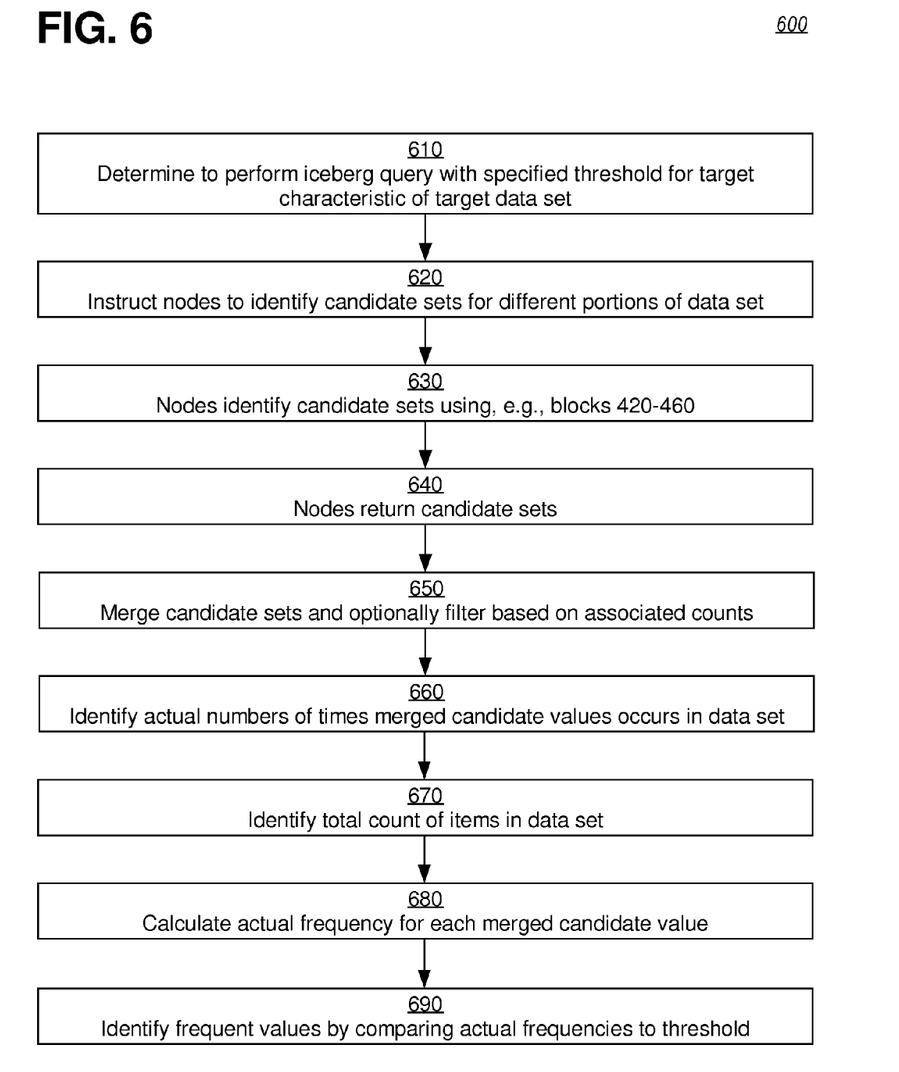
FIG. 6 is a flow chart illustrating a method for executing an iceberg query on a data set by evaluating the items of the data set in parallel.

FIG. 6 is a flow chart 600 illustrating a method for executing an iceberg query on a data set by evaluating the items of the data set in parallel, according to an embodiment. Flow 600 is but one example of a method suitable for parallel evaluation. Other embodiments may comprise additional or fewer steps, in potentially different arrangements. Moreover, flow 600 need not necessarily be performed in parallel.

At block 610, a server, such as server 120, determines to perform an "iceberg query" using a target threshold frequency with respect to a target characteristic on a target data set. The determination may occur as in block 410 of FIG. 4.

At block 620, the server instructs each of a plurality of nodes, such as nodes 131-134, to identify candidate sets of values with respect to different and non-overlapping portions of the target data set. The server may make the determination to divide up performance of the iceberg query for a variety of reasons. For example, the server may be configured to automatically divide up an iceberg query among a certain number of threads, when possible. As another example, the server may determine that the data set is distributed amongst the plurality of nodes. The server provides each node with data identifying the portion that the node should work with, the target frequency, and the target characteristic.

At block 630, the plurality of nodes identify their respective candidate sets of values by performing blocks 420-460 with respect to their respective portions of the data set. In an embodiment, each node operates independently of each other node, and each node allocates its own number of storage buckets based on the threshold frequency. In an embodiment, each node operates in parallel. However, other embodiments do not require independent operation, separately allocated buckets, and/or parallel operation.

At block 640, each node returns its candidate set of values to the server, along with the counts that were associated with the candidate values upon completion of the iterative counting operation in block 460. For example, each node may communicate to the server an array of the candidate values and an array of counts that were in the count buckets after block 460.

At block 650, the server identifies a merged candidate set of distinct values by merging the plurality of candidate sets. The merger is accomplished in such a manner that the merged candidate set is guaranteed to contain all values that occur above the threshold frequency, though the merged candidate set may still contain values that do not actually occur above the threshold frequency. Various techniques exist for merging the candidate sets. For example, in an embodiment, the server may simply take the union of the candidate sets.

In an embodiment, as part of the merger, the server eliminates certain candidate distinct values from the merged candidate set based on their associated counts. For example, for each distinct value in the plurality of candidate sets, the server may calculate the sum of all counts returned for that distinct value. The server forms the merged candidate set by taking the values with the highest sums. For example, in an embodiment, the server can arrive at a correct solution by only using values that have one of the n highest sums, where n is the inverse of the target frequency.

In an embodiment, the merger of block 650 involves the server allocating a separate set of count storage buckets. The server iterates through each value of each candidate set, in a manner similar to blocks 440-450. If the currently iterated value is already assigned a bucket, the bucket is incremented by the count associated with that value in the current candidate set. If the value is not already assigned a bucket, the value is assigned to any available bucket and the bucket is initialized to the count associated with the value. The bucket is considered to be available if it is empty, or if its count is less than 1. If a bucket is not available, each bucket is repeatedly decremented along with the count for the current value until either the count for the current value is 0, or a bucket becomes available.

Figure 7:
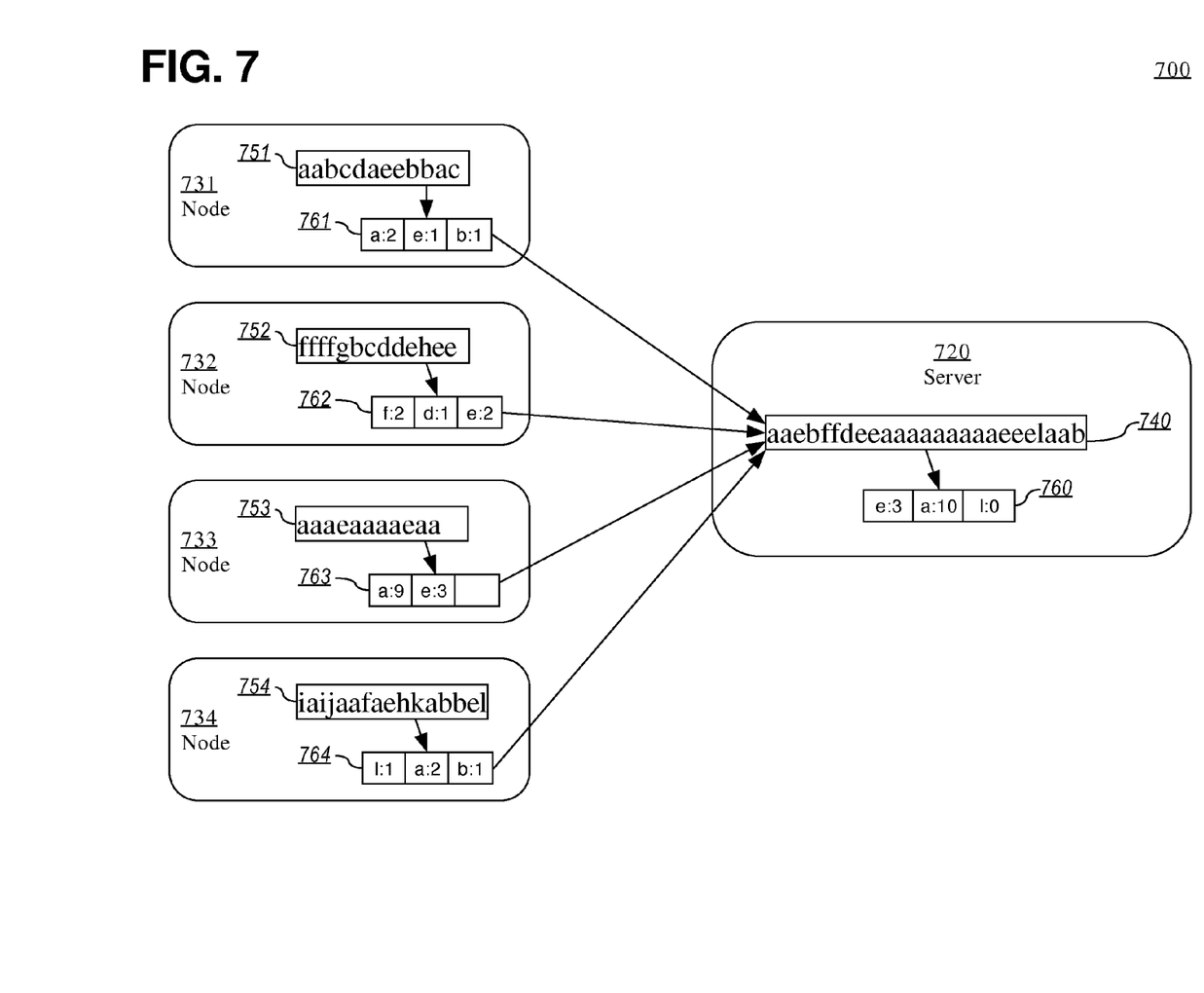
FIG. 7 illustrates the use of count storage buckets at a server to identify a merged candidate set for evaluation.

In an embodiment, the merger of block 650 involves expanding the candidate sets into a stream of values, in which each value is repeated in the data stream in accordance with the sum of its counts in the plurality of candidate sets. An example of such an expansion process is illustrated in FIG. 7, discussed below. The server then produces the data stream using blocks 420-460 of FIG. 4. In an embodiment, for block 650 and other merger strategies, the server can begin the merger process as soon as it receives its first candidate set. That is, the server can allocate count storage buckets and begin processing candidate sets without waiting for the remaining sets.

At block 660, the server identifies the actual number of times each value in the merged candidate set appears for the target characteristic throughout the entire data set. To obtain an actual count for each specific value, the server may need to instruct each node to count the number of times the value appears in the node's assigned portion, and then sum each node's response. However, any suitable counting mechanism may be used.

At block 670, the server identifies the total number of items in data set, if the total number is not already known. Again, one way for the server to identify the total number is to instruct each node to count the items in the node's respective portion.

At block 680, the server calculates an actual frequency with which each value in the merged candidate set occurs for the target characteristic in the data set, based on the results of block 660 and 670.

At block 690, the server removes from the merged candidate set all values whose actual frequency is less than the threshold frequency. The set of all remaining values is the "answer" to the iceberg query.

Example Parallel Evaluation

FIG. 7 illustrates the use of count storage buckets at a server 720 to identify a merged candidate set for evaluation, per block 650 of FIG. 6. As with FIG. 5, FIG. 7 is illustrated using a small and simplified data set. The illustrated techniques are, however, easily applicable to data sets of any size and target frequencies of any number.

Each of nodes 731-734 has been assigned to generate candidate sets 761-764 for different portions 751-754 a data set. Nodes 731-734 generate these candidate sets 761-764 using techniques similar to those described with respect to FIG. 4 and FIG. 5. Nodes 731-734 then send their respective candidate sets 761-764, which include both values and counts for those values, to server 720.

Server 720 forms a proxy data set 740 based on the candidate sets 761-764. Server 720 formed proxy data set 740 by appending, for each candidate set, a number of instances of each value in the candidate set equal to the count associated with the value in the candidate set. For example, as a result of processing candidate set 761, which corresponds to count buckets 571-573 at t7 of FIG. 5, proxy data set 740 begins with two a values, followed by one e value, followed by one b value. As another example, because candidate set 763 comprises a count of nine (9) for the value a, the value a also appears nine times in the middle of proxy data set 740. The exact ordering of proxy data set 740 is not important, as long as the number of each of the values in proxy data set 740 is equal to the sum of the counts for that value in each of the candidate sets 761-764.

Server 720 then identifies the merged candidate set by applying the techniques of FIG. 4 and FIG. 5 to the proxy data set, using count storage buckets 760. The end result is that count storage buckets 760 contain a count of three (3) for the value e, a count of ten (10) for the value a, and a count of zero (0) for the value j. The values in the storage bucket 760 form the merged data set. However, depending on the embodiment, the value j may or may not be deleted from the count storage buckets because of its count of zero. In any event, because the number of storage buckets 760 is at least the inverse of the threshold frequency, storage buckets 760 are guaranteed to contain all values that occur above the threshold frequency across all portions 751-754 of the data set. Server 720 will obtain actual counts of the number of times the values in buckets 760 occur so as to determine the actual set of values that occur above the threshold frequency.

4.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
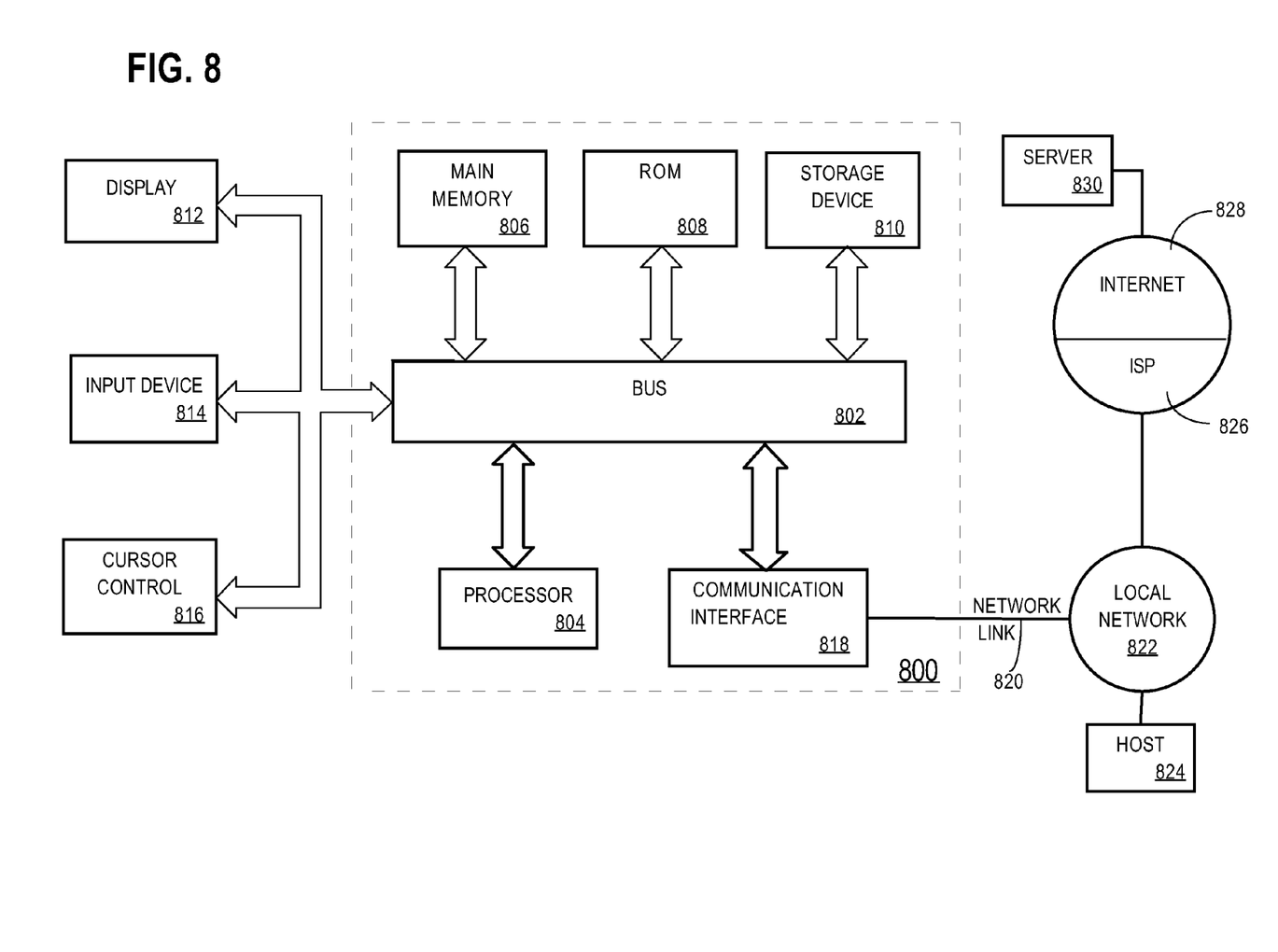
FIG. 8 is block diagram of a computer system upon which embodiments of the invention may be implemented.

For example, FIG. 8 is a block diagram that illustrates a computer system 800. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

5.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of identifying distinct values that occur at or above a threshold frequency within a data set, the method comprising:
    allocating a number of count storage buckets, wherein a function of the threshold frequency determines how many count storage buckets to allocate;
    performing a counting operation on a particular subset of the data set by, for each item of the particular subset:
        when the item corresponds to a distinct value that is currently associated with a particular bucket of the count storage buckets, incrementing a count of the particular bucket;
        when the item corresponds to a distinct value that is not currently associated with any of the count storage buckets and at least one of the count storage buckets is available to store a count for the distinct value, associating the distinct value with an available bucket and initializing a count of the available bucket;
        when the item corresponds to a distinct value that is not currently associated with any of the count storage buckets and none of the count storage buckets is available to store a count for the distinct value, decrementing at least each count of the count storage buckets that is positive;
    selecting, for the particular subset of the data set, a candidate set of distinct values and associated counts from the distinct values that are associated with the count storage buckets after the counting operation;
    selecting a plurality of candidate sets of distinct values and associated counts by repeating at least the counting operation and the selecting of the candidate set for each particular subset of a plurality of non-overlapping subsets of the data set;
    forming a merged candidate set of distinct values by merging the plurality of candidate sets based on the associated counts;
    for each distinct value in the merged candidate set, determining a frequency of occurrence of the distinct value within the data set;
    identifying a set of high-frequency distinct values by comparing the frequency of occurrence of each distinct values in the merged candidate set with the threshold frequency;
    wherein the method is performed by one or more computing devices.

2. The method of claim 1, wherein the number of count storage buckets allocated for each counting operation is less than the number of distinct values to which the items in the data set correspond.

3. The method of claim 1, wherein the number of count storage buckets allocated for each counting operation is the inverse of the threshold frequency, rounded.

4. The method of claim 1, wherein determining that an item corresponds to a distinct value comprises determining that the distinct value appears for a target characteristic of the item.

5. The method of claim 1, wherein merging the plurality of candidate sets comprises:
    for each distinct value found in the plurality of candidate sets, summing all counts associated with the distinct value;
    accepting into the merged candidate set only those distinct values having the highest summed counts, wherein the number of values in the merged candidate set is based on the inverse of the threshold frequency.

6. The method of claim 1, wherein merging the plurality of candidate sets comprises:
    generating a proxy data set comprising one or more members for each distinct value in the plurality of candidate sets, wherein the one or more members correspond, in number, to the associated counts for that distinct value;
    performing a proxy counting operation on the proxy data set by, for each member of the proxy data set:
        when the member corresponds to a distinct value that is currently associated with a particular bucket of the count storage buckets, incrementing a count of the particular bucket;
        when the member corresponds to a distinct value that is not associated with any of the count storage buckets and at least one of the count storage buckets is available to store a count for the distinct value, associating the distinct value with an available bucket and initializing a count of the available bucket;

when the member corresponds to a distinct value that is not associated with any of the count storage buckets and none of the count storage buckets is available to store a count for the distinct value, decrementing at least each count of the count storage buckets that is positive;

identifying the merged candidate set based on which distinct values are associated with the count storage buckets upon completion of the proxy counting operation.

7. The method of claim 1, wherein a count storage bucket is an available bucket when the count storage bucket is empty or when the count storage bucket stores a count that is less than a count to which buckets are initialized.

8. The method of claim 1, wherein repeating the counting operation for each particular subset of the data set comprises performing each counting operation at a different node of a plurality of nodes.

9. The method of claim 8, wherein at least two or more nodes in the plurality of nodes perform the counting operation in parallel using different sets of count storage buckets.

10. The method of claim 8, wherein each node has exclusive access to the particular subset of the data set for which the node performs the counting operation.

11. The method of claim 1, wherein decrementing at least each count of the count storage buckets that is positive comprises decrementing each count by one.

12. One or more non-transitory computer-readable storage media storing instructions for identifying distinct values that occur at or above a threshold frequency within a data set wherein the instructions, when executed by one or more computing devices, cause performance of:
    allocating a number of count storage buckets, wherein a function of the threshold frequency determines how many count storage buckets to allocate;
    performing a counting operation on a particular subset of the data set by, for each item of the particular subset:
        when the item corresponds to a distinct value that is currently associated with a particular bucket of the count storage buckets, incrementing a count of the particular bucket;
        when the item corresponds to a distinct value that is not currently associated with any of the count storage buckets and at least one of the count storage buckets is available to store a count for the distinct value, associating the distinct value with an available bucket and initializing a count of the available bucket;
        when the item corresponds to a distinct value that is not currently associated with any of the count storage buckets and none of the count storage buckets is available to store a count for the distinct value, decrementing at least each count of the count storage buckets that is positive;
    selecting, for the particular subset of the data set, a candidate set of distinct values and associated counts from the distinct values that are associated with the count storage buckets after the counting operation;
    selecting a plurality of candidate sets of distinct values and associated counts by repeating at least the counting operation and the selecting of the candidate set for each particular subset of a plurality of non-overlapping subsets of the data set;
    forming a merged candidate set of distinct values by merging the plurality of candidate sets based on the associated counts;
    for each distinct value in the merged candidate set, determining a frequency of occurrence of the distinct value within the data set;
    identifying a set of high-frequency distinct values by comparing the frequencies frequency of occurrence of the each distinct values in the merged candidate set with the threshold frequency.

13. The one or more non-transitory computer-readable storage media of claim 12, wherein the number of count storage buckets allocated for each counting operation is less than the number of distinct values to which the items in the data set correspond.

14. The one or more non-transitory computer-readable storage media of claim 12, wherein the number of count storage buckets allocated for each counting operation is the inverse of the threshold frequency, rounded.

15. The one or more non-transitory computer-readable storage media of claim 12, wherein determining that an item corresponds to a distinct value comprises determining that the distinct value appears for a target characteristic of the item.

16. The one or more non-transitory computer-readable storage media of claim 12, wherein merging the plurality of candidate sets comprises:
    for each distinct value found in the plurality of candidate sets, summing all counts associated with the distinct value;
    accepting into the merged candidate set only those distinct values having the highest summed counts, wherein the number of values in the merged candidate set is based on the inverse of the threshold frequency.

17. The one or more non-transitory computer-readable storage media of claim 12, wherein merging the plurality of candidate sets comprises:
    generating a proxy data set comprising one or more members for each distinct value in the plurality of candidate sets, wherein the one or more members correspond, in number, to the associated counts for that distinct value;
    performing a proxy counting operation on the proxy data set by, for each member of the proxy data set:
        when the member corresponds to a distinct value that is currently associated with a particular bucket of the count storage buckets, incrementing a count of the particular bucket;
        when the member corresponds to a distinct value that is not associated with any of the count storage buckets and at least one of the count storage buckets is available to store a count for the distinct value, associating the distinct value with an available bucket and initializing a count of the available bucket;
        when the member corresponds to a distinct value that is not associated with any of the count storage buckets and none of the count storage buckets is available to store a count for the distinct value, decrementing at least each count of the count storage buckets that is positive;
    identifying the merged candidate set based on which distinct values are associated with the count storage buckets upon completion of the proxy counting operation.

18. The one or more non-transitory computer-readable storage media of claim 12, wherein a count storage bucket is an available bucket when the count storage bucket is empty or when the count storage bucket stores a count that is less than a count to which buckets are initialized.

19. The one or more non-transitory computer-readable storage media of claim 12, wherein repeating the counting operation for each particular subset of the data set comprises performing each counting operation at a different node of a plurality of nodes.

20. The one or more non-transitory computer-readable storage media of claim 19, wherein at least two or more nodes in the plurality of nodes perform the counting operation in parallel using different sets of count storage buckets.

21. The one or more non-transitory computer-readable storage media of claim 19, wherein each node has exclusive access to the particular subset of the data set for which the node performs the counting operation.

22. The one or more computer-readable storage media of claim 12, wherein decrementing at least each count of the count storage buckets that is positive comprises decrementing each count by one.

23. A system for identifying distinct values that occur at or above a threshold frequency within a data set, comprising:
   a plurality of processors; and
   one or more memories comprising a plurality of sets of count storage buckets;
   one or more computer-readable storage media storing the data set;
   wherein the plurality of processors is configured to allocate the plurality of sets of count storage buckets by allocating, for each particular set of the plurality of sets, a number of buckets, wherein a function of the threshold frequency determines how many count storage buckets to allocate;
   wherein a first subset of the plurality of processors is configured to instruct each of a plurality of non-overlapping subsets of the plurality of processors to identify candidate sets of high frequency items for different portions of the data set;
   wherein each of the plurality of non-overlapping subsets of the plurality of processors is configured to identify a candidate set of high frequency items and associated proxy counts using a different particular set of count storage buckets by, for each item of a portion of the data set:
      when the item corresponds to a distinct value that is currently associated with a particular bucket of the particular set of count storage buckets, incrementing a proxy count of the particular bucket;
      when the item corresponds to a distinct value that is not currently associated with any bucket in the particular set of count storage buckets and at least one bucket in the particular set of count storage buckets is available to store a proxy count for the distinct value, associating the distinct value with an available bucket and initializing a proxy count of the available bucket;
      when the item corresponds to a distinct value that is not currently associated with any bucket in the particular set of count storage buckets and no bucket in the particular set of count storage buckets is available to store a proxy count for the distinct value, decrementing at least each proxy count of the particular set of count storage buckets that is positive;
   wherein the first subset of the plurality of processors is further configured to:
      form a merged candidate set of distinct values by merging the candidate sets based on the associated proxy counts;
      for each distinct value in the merged candidate set, determine a frequency of occurrence of the distinct value within the data set;
      identify a set of high-frequency distinct values by comparing the frequency of occurrence of each merged candidate set with the threshold frequency.

24. The system of claim 23, wherein the number of count storage buckets in each set of count storage buckets is less than the number of distinct values to which the items in the data set correspond.

25. The system of claim 23, wherein the number of count storage buckets allocated in each set of count storage buckets is the inverse of the threshold frequency, rounded.

26. The system of claim 23, wherein determining that an item corresponds to a distinct value comprises determining that the distinct value appears for a target characteristic of the item.

27. The system of claim 23, wherein merging the candidate sets comprises:
   for each distinct value found in the candidate sets, summing all proxy counts associated with the distinct value;
   accepting into the merged candidate set only those distinct values having the highest summed proxy counts, wherein the number of values in the merged candidate set is based on the inverse of the threshold frequency.

28. The system of claim 23, wherein merging the candidate sets comprises:
   generating a proxy data set comprising one or more members for each distinct value in the candidate sets, wherein the one or more members correspond, in number, to the associated proxy counts for that distinct value;
   performing a proxy counting operation on the proxy data set by, for each member of the proxy data set:
      when the member corresponds to a distinct value that is currently associated with a particular bucket of a first set of count storage buckets, incrementing a proxy count of the particular bucket;
      when the member corresponds to a distinct value that is not associated with any bucket in the first set of count storage buckets and at least one bucket in the first set of count storage buckets is available to store a proxy count for the distinct value, associating the distinct value with an available bucket and initializing a proxy count of the available bucket;
      when the member corresponds to a distinct value that is not associated with any bucket in the first set of count storage buckets and no bucket in the first set of count storage buckets is available to store a proxy count for the distinct value, decrementing at least each proxy count of the first set of count storage buckets that is positive;
   identifying the merged candidate set based on which distinct values are associated with the first set of count storage buckets upon completion of the proxy counting operation.

29. The system of claim 23, wherein a count storage bucket is an available bucket when the count storage bucket is empty or when the count storage bucket stores a proxy count that is less than a proxy count to which count storage buckets are initialized.

30. The system of claim 23, wherein each different non-overlapping subset of the plurality of processors resides at a different set of one or more computing devices.

31. The system of claim 23, wherein at least two or more of the non-overlapping subsets of the plurality of processors identify candidate sets in parallel.

32. The system of claim 23, wherein each different non-overlapping subset of the plurality of processors has exclusive access to the particular portion of the data set for which the non-overlapping subset of the plurality of processors identifies candidate sets.

33. The system of claim 23, wherein decrementing at least each count of the count storage buckets that is positive comprises decrementing each count by one.

* * * * *